United States Patent [19]
Moskowitz et al.

[11] Patent Number: 6,064,577
[45] Date of Patent: May 16, 2000

[54] BOTTOM INSERT BELT CLIP MOUNT ON BATTERY

[75] Inventors: Douglas Wayne Moskowitz, Ft. Lauderdale; Faris Habbaba, Boca Raton, both of Fla.

[73] Assignee: Motorola, Inc., Schaumburg, Ill.

[21] Appl. No.: 09/055,446

[22] Filed: Apr. 6, 1998

[51] Int. Cl.[7] .................................................. H04B 1/03
[52] U.S. Cl. .......................... 361/814; 361/814; 206/340; 206/348; 429/96; 429/99; 429/100; 379/426; 379/433; 224/252
[58] Field of Search .............................. 361/814; 429/99, 429/100, 96; 455/438; 379/433, 426; 224/252

[56] References Cited

U.S. PATENT DOCUMENTS

| 5,081,709 | 1/1992 | Benyo et al. | 455/348 |
|---|---|---|---|
| 5,241,592 | 8/1993 | Carlson et al. | 379/433 |
| 5,253,292 | 10/1993 | Fluder et al. | 379/426 |
| 5,385,282 | 1/1995 | Chen | 224/252 |
| 5,414,596 | 5/1995 | Eaton et al. | 361/814 |
| 5,436,088 | 7/1995 | Castameda et al. | 429/96 |
| 5,460,906 | 10/1995 | Leon et al. | |

*Primary Examiner*—Leo P. Picard
*Assistant Examiner*—Tuan Dinh
*Attorney, Agent, or Firm*—M. Mansour Ghomeshi

[57] ABSTRACT

A belt clip (100) attaches to a battery housing of a communication device to be worn by a user. The belt clip (100) includes a base (104) and a flexible spring loaded latch (106) having an opening. The base (104) is comprised of a pair of rails (108). The pair of rails (108) attach to a battery housing (116) via a pair of undercuts (120). The belt clip (100) is prevented from moving due to the opening of the latch slipped and hooked over a ramped post (124) as the belt clip is slid, from the bottom to the top of the battery, through the pair of undercuts (120) formed by a pair of protrusions that are integrally raised from the top surface of the slim body on opposed sides of the ramping post (124) for providing a belt clip guiding slot. The sliding action is continued, within the slot, until the latch is pressed against and mounted on the ramping post (124).

4 Claims, 4 Drawing Sheets

BOTTOM INSERT BELT CLIP MOUNT ON BATTERY

FIELD OF THE INVENTION

This invention relates in general to battery housings and more particularly to battery housings adapted for the insertion of belt clips used in conjunction with communication devices as worn by a user.

BACKGROUND OF THE INVENTION

The design of belt clips, as the name implies, used in connection with communication devices, is known in the art. Belt clips are generally used to attach a communication device such as a radio, a telephone, or a pager, to a piece of clothing, such as a user's belt. They are often contoured for secured attachment to the battery housing of the communication device in order to prevent accidental disengagement.

As the choices of various battery housings with different slimness profiles, depending on the battery capacity, are presented to the user, the ability to use the same belt clip for attachment to these different battery housings of different thickness for the same radio becomes a challenge. For example, in a thicker battery housing for a radio, the belt clip is normally attached from the top where the attachment mechanism for the battery and radio is also located. However, in a slimmer battery housing for the same radio, the slimmer battery housing is still required to have the same thickness at the top of the battery to accommodate the same attachment mechanism while the rest of the battery body tapers to a slimmer profile. Because of this gradient change in thickness near the top of the battery housing and the desire to minimize the width of the battery, the same belt clip mount existing on the thicker battery is no longer usable on the thinner battery.

Accordingly, a need exists for a slim battery housing to have a belt clip insertion mount from below to accommodate an interchangeable belt clip that is used for a thick or a thin battery of the same radio.

DETAILED DESCRIPTION OF THE PREFERRED EMBODIMENT

Figure 1:
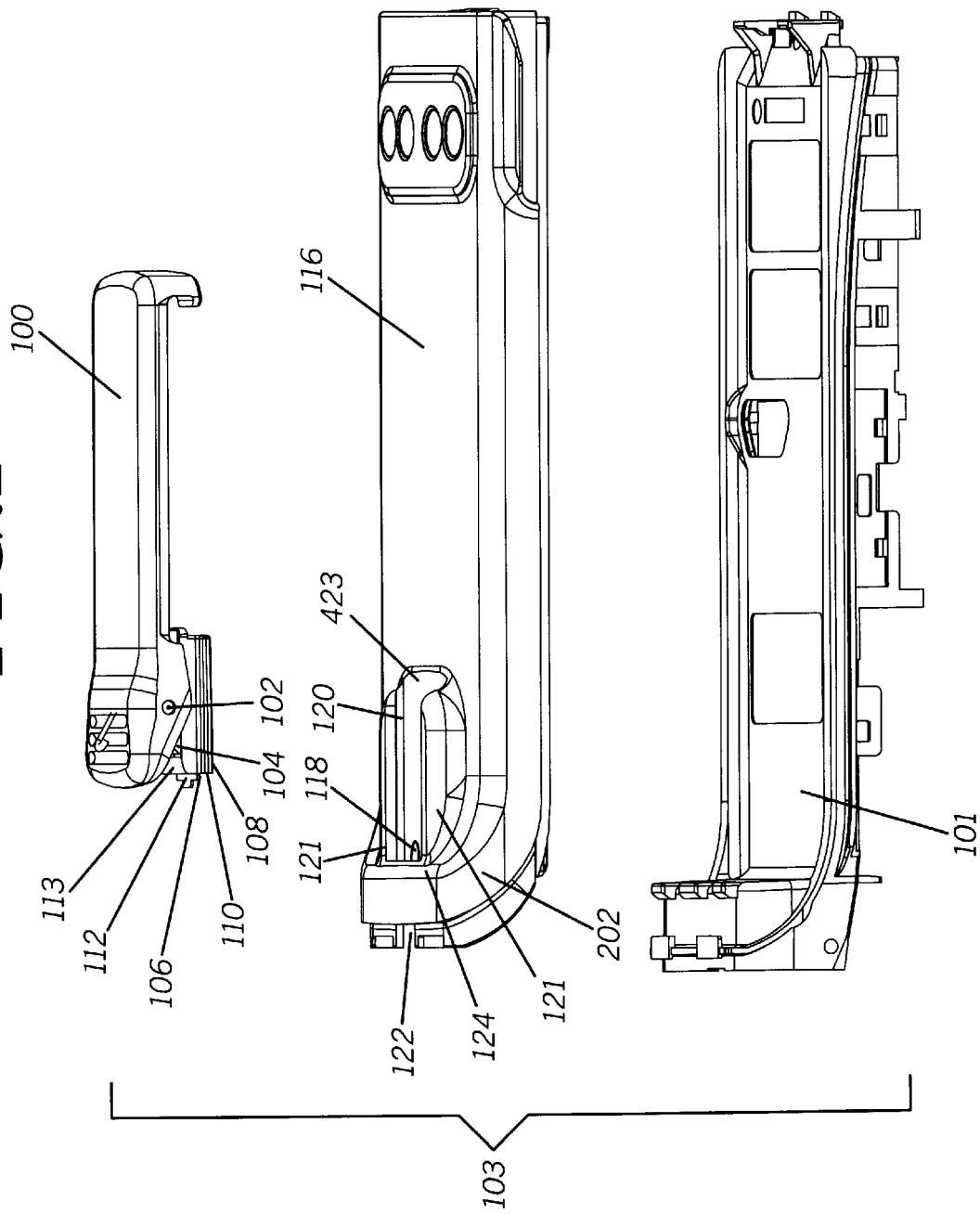
FIG. 1 is an exploded isometric view of a belt clip as used with a communication device in accordance with the present invention.

Referring to FIG. 1, there is shown an exploded isometric view of a belt clip 100 in conjunction with a communication device 103 in accordance with the present invention. The communication device includes a communication or radio housing 101 and a battery housing 116 that attaches to the backside of the radio housing. The belt clip 100 includes a pin 102 and an attachment base 104. The base 104 is comprised of a pair of rails 108, in the shape of a boot when looking at the side, which ends at an edge to form a pair of boot-shaped edges 110. The base 104 is connected to the belt clip 100 via the pin 102. The pin 102 passes through a spring (see 250 in FIG. 2) that provides a tension force on the belt clip 100 in a direction towards a battery housing 116 that forms part of a radio housing 101. When not pulled away by a user, the communication device attached base 104 is angled towards the body of the belt clip 100 due to the force of the spring. This results in the belt clip 100 being forced in the direction of the battery housing 116. A spring loaded or flexible latch 106 is wrapped around the attachment base 104. The latch 106 is provided to lock the belt clip 100 to the communication device and includes a finger release 112 that has an opening 113 within the finger release. The latch 106 is preferably made of steel to give it the desired spring action. The belt clip 100 is designed to be upwardly attached to the battery housing 116.

Figure 4:
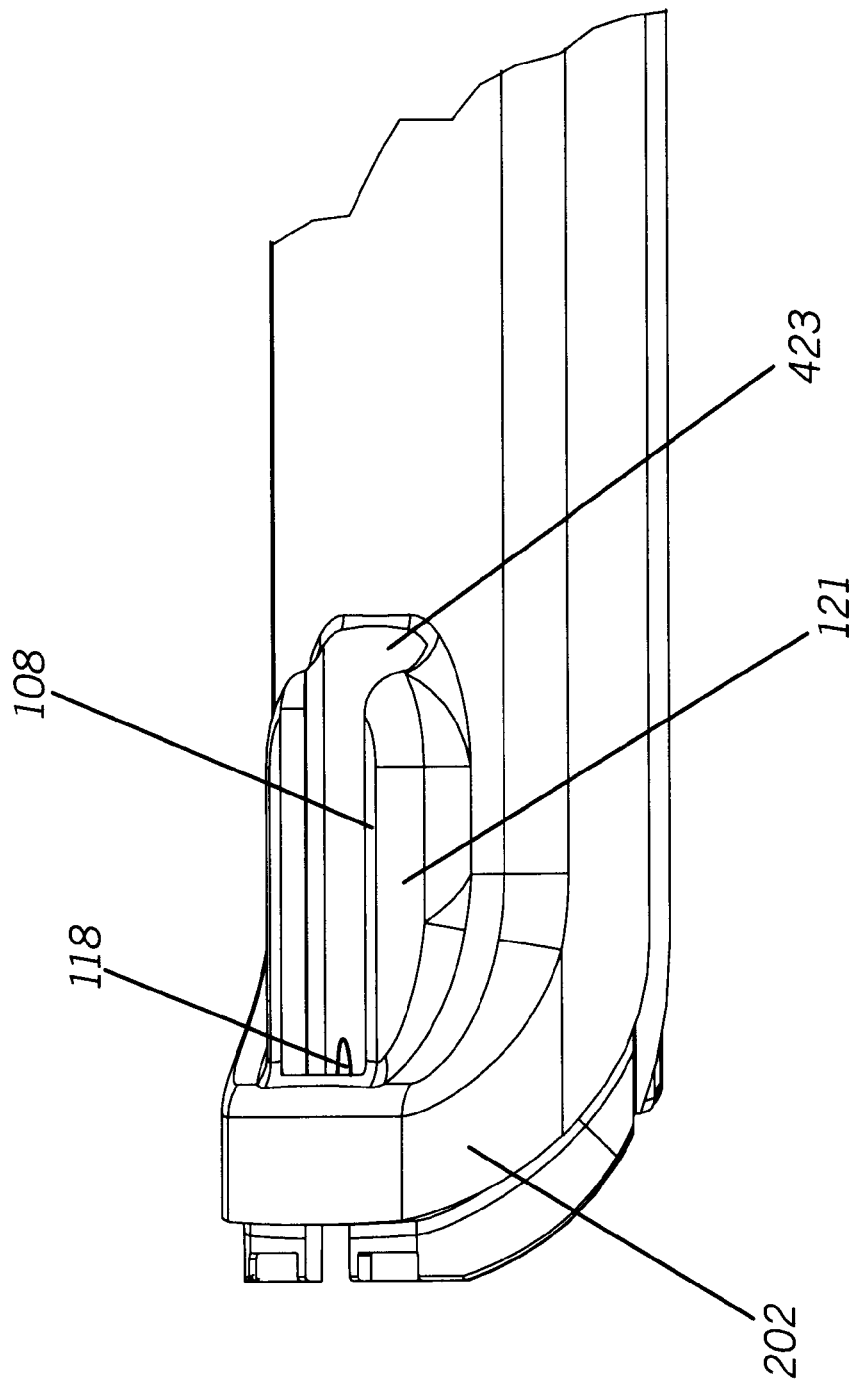
FIG. 4 is a top front isometric view of a battery housing in accordance with the present invention.

The battery housing 116 is comprised of a small center ramp 118 having its peak, in the shape of a nose, forming a ramping or sloped post 124. The slope of the ramp gradually forces the flexible latch 106 bend upwards towards the handle of the belt clip. This ramp 118 is located in between a pair of raised side-undercuts 120 which receive the pair of rails 108 of the belt clip. A pair of protrusions 121 are integrally raised from the top surface of the slim body of the battery housing to provide the undercuts on opposed sides of the ramping post 124 for forming a belt clip guiding slot 423. The dimensions of the pair of side-undercuts 120 are commensurate with the dimensions of the pair of rails 108 so that the pair of rails 108 can mate with the pair of side-undercuts 120, within the belt clip guiding slot 423. Referring also to FIG. 4 for a top view, the communication device housing mating skirt 202 integrally meeting the top surfaces of the pair of protrusions 121 can be seen to form the belt clip guiding slot 423 substantially in the shape of a raised "π" symbol. In accordance with the present invention, the pair of rails (108) receiving undercuts 120 and the protrusions 120 that form them have a preferably angled edge 302 by which allows the rails to pull out from the undercuts under extreme pulling without damaging the battery housing 116 beyond use.

The battery housing 116 also includes a finger relief 122 for allowing a finger or a tool to reach, press, and release the latch 106 of the belt clip using the clip's finger release 112 that extends there through. As mentioned before and emphasized again, the high end of the ramp serves as a post 124 to provide the locking mechanism for the flexible latch 106. This post 124 prohibits the movement of the belt clip 100 once the pair of rails 108 are within the confines of the pair of side-undercuts 120.

The highest ledge of the pair of side-undercuts 120 is taller than the height of about ⅞th bottom portion or body of the battery housing 116 and is shorter than the top ⅛th top portion of the battery housing 116. The top ⅛th of the battery housing 116 is taller because it has to have sufficient space to accommodate a pair of raised casting stops that are included in the radio casting 128. In fact, this top ⅛th of the battery housing is in the form of a raised battery cover extension or communication device housing skirt 202 that has sufficient space and indentations underneath to receive the corresponding latching mechanisms of the mating communication device housing.

To attach the belt clip 100 to the battery housing 116, the user slides, in an upward direction, from the bottom of the battery housing towards the skirt, the pair of rails 108 of the belt clip into the mating pair of side-undercuts 120 until the flexible latch 106 snaps beyond and over the ramped post 124 by pressing the handle or lever of the belt clip 100 down against the flexible latch 106 to bend it towards the handle, while the pair of rails 108 slide freely into the pair of side-undercuts 120. The ramping feature of the post 124 provides for a smooth assembly action that does not require any tool.

When removal of the belt clip 100 from the battery housing 116 is desired, the user presses the finger release 112 in a direction towards the belt clip 100 until the finger release 112 is above the post 124. At this point, the user pushes the belt clip 100 down, away, and out of the pair of side-undercuts 120.

Figure 2:
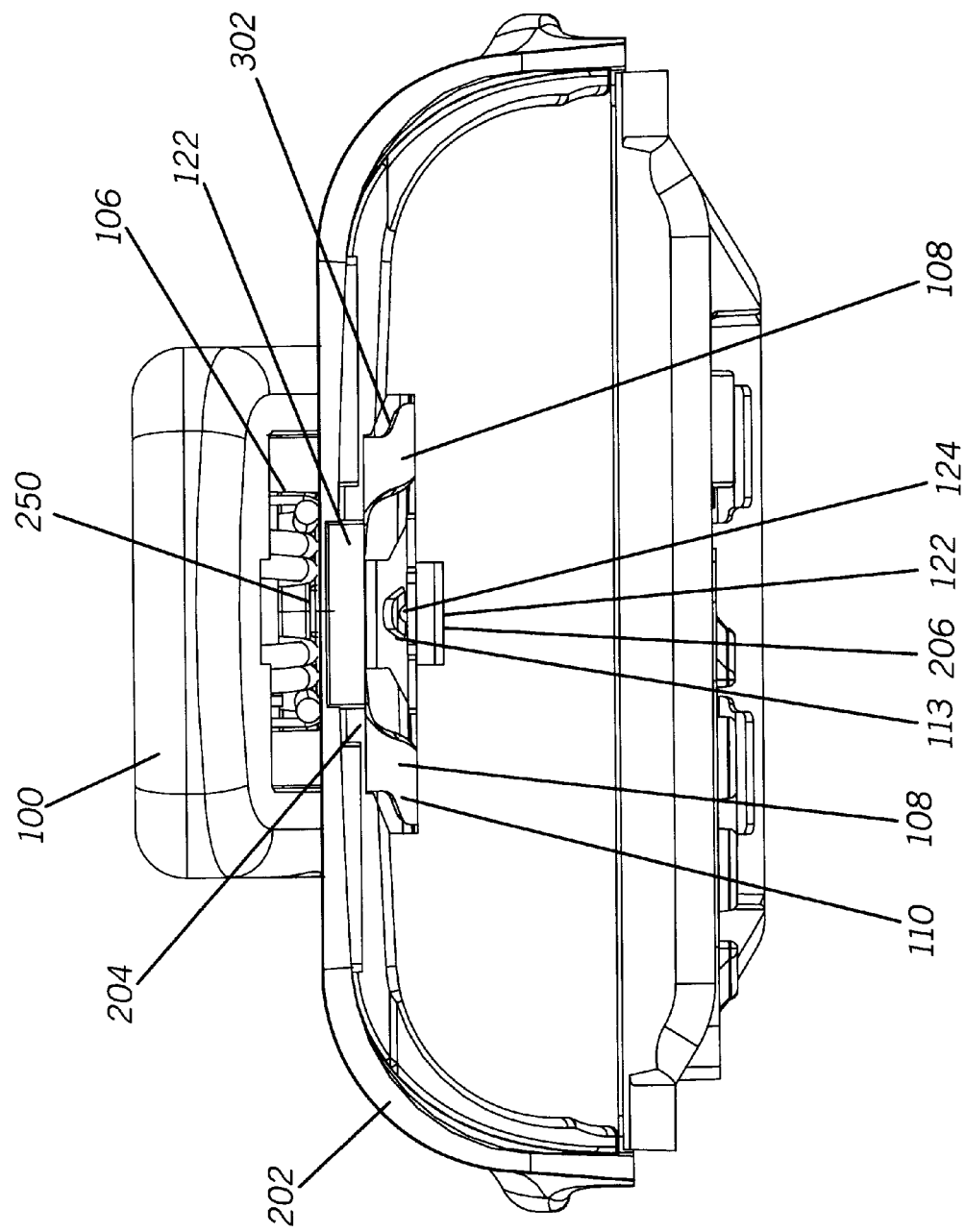
FIG. 2 is a top cross-sectional view of a belt clip attached to a battery housing in accordance with the present invention.

Referring to FIG. 2, there is shown a top view of a belt clip 100 in accordance with the present invention. As partially hidden by the handle or lever of the clip, the flexible latch 106 is wrapped around the base 104. When the pair of rails 108 are positioned within the pair of side-undercuts 120, the joining top horizontal portion 204 of the base between the pair of boot-shaped ends or edges 110 integrally formed as the front of the pair of rails 108 are almost pinned against the side edge or brim of the battery housing skirt 202, to prevent further upward movement in case the sloped post 124 does not catch the latch opening 113. However, the sloped post 124 is designed to stop further upward movement of the belt clip by slipping, hooking and otherwise capturing the latch opening 113 over the sloped post 124. The brim of the skirt is provided to deter the belt clip 100 from sliding out from its secured location within the pair of side-undercuts 120 if the plastic post 124 were to yield from excessive forces applied through the steel flexible latch 106.

The battery housing further includes an indentation 204 recessed from the top surface of the slim body and located slightly above (towards the skirt 202) the ramping post 124 and underneath the communication device housing mating skirt 202. Preferably the indentation 206 is tapered to provide a latch release access area more accessible when a finger or a tool is inserted through the finger relief 122. This finger relief 122 is seen from a top end battery housing surface to have a short "T" shaped opening. The short "T" shaped opening is formed by the communication device housing mating skirt 202 integrally meeting the top surfaces of the pair of protrusions 108 at the top of the "T" and the bottom of the "T" centered by the indentation 206 of the battery housing.

Figure 3:
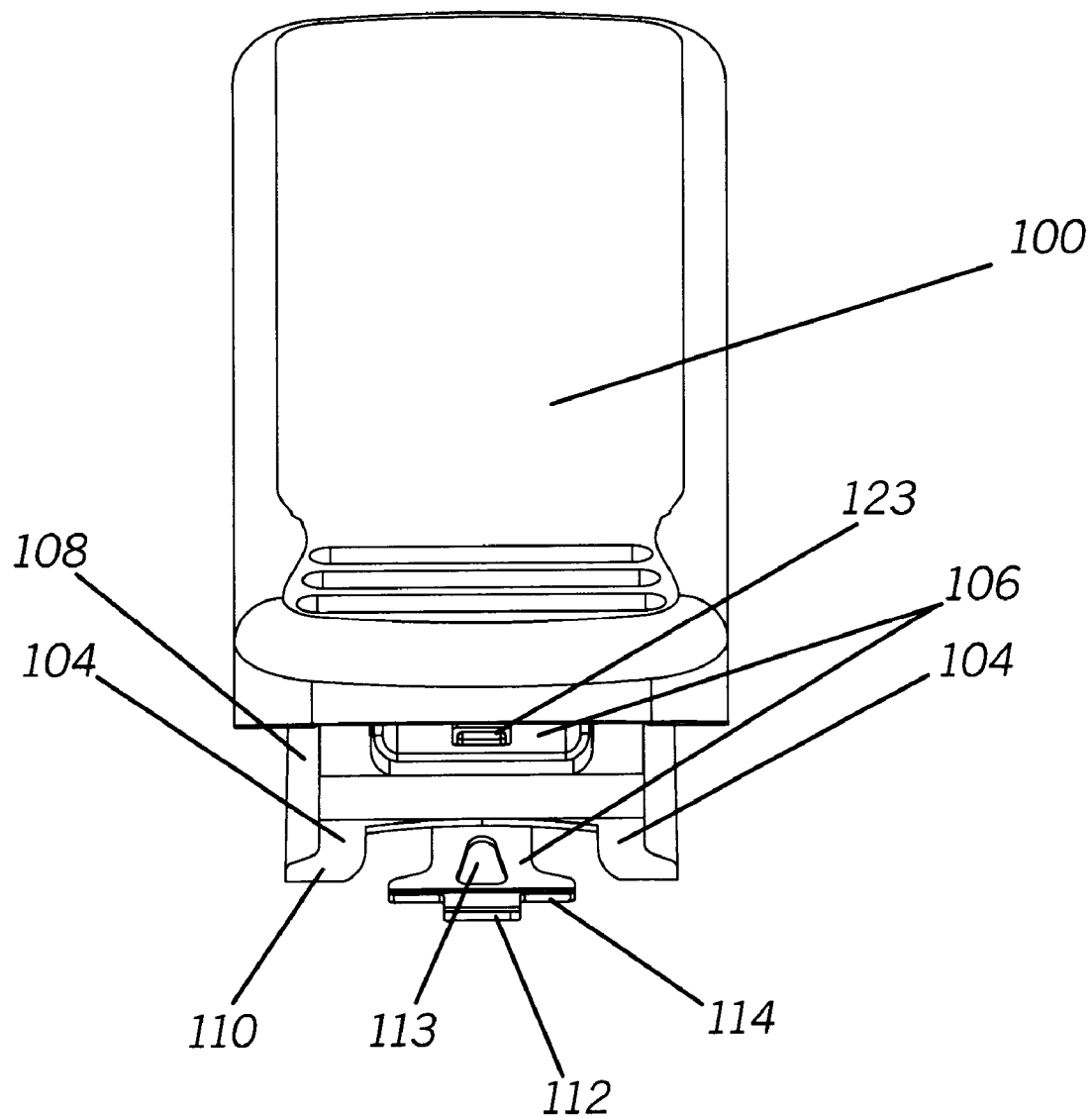
FIG. 3 is a top front isometric view of a belt clip in accordance with the present invention.

Referring to FIG. 3, there is shown a top front isometric view of the belt clip 100 in accordance with the present invention. The base 104 includes the pair of rails 108. The pair of rails 108 are sufficiently spaced to allow a finger to lift the finger release 112 of the flexible latch 106 over the ramping or sloped post 124 of the battery housing such that the latch's opening 113 is no longer captured by the post, when removal of the belt clip is desired. The latch 106 is wrapped around the base 104 of the belt clip 100. The latch 106 is connected to the base 104 at a connecting lip point 123. The connecting point 123, in the form of a protruding lip, ensures that the flexible latch 106 remains stationary.

In essence, the belt clip of the present invention provides the user with a slim battery housing that can reliably accommodate a belt clip originally designed for a thicker battery housing. The belt clip and battery housing are assembled together by sliding a pair of rails of the belt clip into a mating pair of undercuts of the battery housing. This pair of undercuts, together with the battery cover skirt above, form a rectangular trough or slot to guide and slide the belt clip into the slot and the corresponding undercuts until the opening of the belt clip's latch is hooked over a ramping post of the battery housing. Once attached, the ramping post and the pair of undercuts of the battery housing both act to prohibit the mobility of the belt clip. The battery housing also includes a top opening for the finger release of the belt clip to protrude through and to be released by lifting the finger release until it's latch opening is no longer hooked over the top centered ramping post of the battery housing.

We claim:

1. A battery housing comprising:

a slim body having a top surface;

a ramping post integrally mounted on the top surface of the slim body;

a pair of protrusions integrally raised from the top surface of the slim body, the pair of protrusions each having an undercut and mounted on opposed sides of the ramping post for forming a belt clip guiding slot;

a communication device housing mating skirt extending from the top surface of the battery housing for coupling to the communication device housing, the communication device housing mating skirt having a second slim width from the back surface of the communication device housing the second slim width being wider than the first slim width; and an indentation recessed from the top surface of the slim body above the ramping post and underneath the communication device housing mating skirt.

2. The battery housing of claim 1, wherein the indentation comprises a tapered latch release access area.

3. The battery housing of claim 1, further comprising a top end surface having a short "T" shaped opening, the short "T" shaped opening formed by the communication device housing mating skirt integrally meeting the top surfaces of the pair of protrusions at the top of the "T" and the bottom of the "T" centered by the indentation of the battery housing.

4. The battery housing of claim 3, wherein the communication device housing mating skirt integrally meeting the top surfaces of the pair of protrusions form the belt clip guiding slot substantially in the shape of a raised $\pi$ symbol.

\* \* \* \* \*